United States Patent
Nagashima (10) Patent No.: US 9,339,794 B2
(45) Date of Patent: May 17, 2016

(54) CATALYST COMPOSITION FOR EXHAUST GAS PURIFICATION AND EXHAUST GAS PURIFYING CATALYST FOR AUTOMOBILES

(71) Applicant: N.E. CHEMCAT CORPORATION, Tokyo (JP)

(72) Inventor: Ken Nagashima, Shizuoka (JP)

(73) Assignee: N.E. CHEMCAT CORPORATION, Tokyo (JP)

( * ) Notice: Subject to any disclaimer, the term of this patent is extended or adjusted under 35 U.S.C. 154(b) by 0 days.

(21) Appl. No.: 14/398,515

(22) PCT Filed: May 28, 2013

(86) PCT No.: PCT/JP2013/064684
§ 371 (c)(1),
(2) Date: Nov. 3, 2014

(87) PCT Pub. No.: WO2014/002667
PCT Pub. Date: Jan. 3, 2014

(65) Prior Publication Data
US 2015/0111727 A1    Apr. 23, 2015

(30) Foreign Application Priority Data
Jun. 28, 2012 (JP) ................. 2012-145555

(51) Int. Cl.
*B01J 23/00* (2006.01)
*B01J 23/02* (2006.01)
(Continued)

(52) U.S. Cl.
CPC .............. *B01J 23/63* (2013.01); *B01D 53/945* (2013.01); *B01J 35/023* (2013.01);
(Continued)

(58) Field of Classification Search
CPC ............ B01J 23/10; B01J 23/40; B01J 23/42; B01J 23/44; B01J 23/46; B01J 23/464; B01J 23/56; B01J 23/63; B01J 21/04; B01J 21/066
USPC ......... 502/302–304, 327, 332–334, 339, 349, 502/355, 439, 527.12, 527.13
See application file for complete search history.

(56) References Cited

U.S. PATENT DOCUMENTS 4,843,056 A * 6/1989 Matsumoto .......... B01D 53/945
502/302
4,904,633 A * 2/1990 Ohata .................. B01D 53/945
423/213.5

(Continued)

FOREIGN PATENT DOCUMENTS

JP    61-38626 A    2/1986
JP    63-137752 A   6/1988

(Continued)

OTHER PUBLICATIONS

International Search Report dated Jul. 9, 2013, issued in corresponding application No. PCT/JP2013/064684.

*Primary Examiner* — Cam N. Nguyen
(74) *Attorney, Agent, or Firm* — Westerman, Hattori, Daniels & Adrian, LLP (57) ABSTRACT

The present invention is to provide a catalyst composition for exhaust gas purification, which is superior in purification performance for nitrogen oxides ($NO_x$), carbon monoxide (CO) and hydrocarbons (HC) in exhaust gas to be discharged from an internal combustion engine of a gasoline vehicle or the like; and an catalyst for exhaust gas purification for automobiles. The present invention is a catalyst composition for exhaust gas purification for purifying nitrogen oxides, carbon monoxide, and hydrocarbons in exhaust gas, which includes a catalyst composition wherein rhodium is supported, together with an α-alumina particle, on a zirconia-type base material, characterized in that average particle size of the α-alumina particle is 10 nm to 1 μm, and also is smaller than average particle size of the zirconia ($ZrO_2$)-type base material.

13 Claims, 3 Drawing Sheets

(51) Int. Cl.
| | |
|---|---|
| *B01J 23/08* | (2006.01) |
| *B01J 23/10* | (2006.01) |
| *B01J 23/40* | (2006.01) |
| *B01J 23/42* | (2006.01) |
| *B01J 23/44* | (2006.01) |
| *B01J 23/56* | (2006.01) |
| *B01J 21/04* | (2006.01) |
| *B01J 23/63* | (2006.01) |
| *B01J 37/02* | (2006.01) |
| *B01J 35/02* | (2006.01) |
| *B01D 53/94* | (2006.01) |
| *B01J 23/46* | (2006.01) |

(52) U.S. Cl.
CPC .... *B01J 37/0244* (2013.01); *B01D 2255/1021* (2013.01); *B01D 2255/1023* (2013.01); *B01D 2255/1025* (2013.01); *B01D 2255/2092* (2013.01); *B01D 2255/407* (2013.01); *B01D 2255/9022* (2013.01); *B01D 2255/9202* (2013.01); *B01D 2255/9207* (2013.01); *B01D 2258/014* (2013.01); *B01J 23/464* (2013.01); *B01J 2523/00* (2013.01); *Y02T 10/22* (2013.01)

(56) References Cited

U.S. PATENT DOCUMENTS

| | | | | |
|---|---|---|---|---|
| 4,910,810 A * | 3/1990 | Solomon | ............... | A47K 13/10 4/241 |
| 5,057,483 A * | 10/1991 | Wan | ............... | B01D 53/945 423/213.5 |
| 5,130,109 A * | 7/1992 | Wan | ............... | B01D 53/945 423/213.2 |
| 5,254,519 A * | 10/1993 | Wan | ............... | B01D 53/945 423/213.5 |
| 5,490,977 A * | 2/1996 | Wan | ............... | B01D 53/945 423/210 |
| 6,261,989 B1 * | 7/2001 | Tanaka | ............... | B01D 53/945 29/890 |
| 6,497,848 B1 | 12/2002 | Deeba et al. | | |
| 6,881,384 B1 * | 4/2005 | Uenishi | ............... | B01D 53/945 422/177 |
| 7,205,257 B2 * | 4/2007 | Tanaka | ............... | B01D 53/945 502/302 |
| 7,638,460 B2 * | 12/2009 | Nakamura | ............... | B01D 53/945 502/258 |
| 7,759,279 B2 * | 7/2010 | Shiratori | ............... | B01D 53/945 502/303 |
| 8,158,554 B2 * | 4/2012 | Wakamatsu | ............... | B01D 53/945 502/252 |
| 8,999,886 B2 * | 4/2015 | Takeshima | ............... | B01D 53/945 502/302 |
| 2007/0004589 A1 * | 1/2007 | Kimura | ............... | B01D 53/945 502/302 |
| 2007/0099796 A1 * | 5/2007 | Nakamura | ............... | B01D 53/945 502/304 |

FOREIGN PATENT DOCUMENTS

| | | |
|---|---|---|
| JP | 64-4250 A | 1/1989 |
| JP | 64-11643 A | 1/1989 |
| JP | 3-106446 A | 5/1991 |
| JP | 5-237390 A | 9/1993 |
| JP | 6-142517 A | 5/1994 |
| JP | 6-75675 B2 | 9/1994 |
| JP | 9-215922 A | 8/1997 |
| JP | 2002-326033 A | 11/2002 |
| JP | 2003-507177 A | 2/2003 |
| JP | 2007-9825 A | 1/2007 |
| JP | 2007-167707 A | 7/2007 |
| JP | 2007-329768 A | 12/2007 |
| JP | 2010-22918 A | 2/2010 |
| JP | 2011-200817 A | 10/2011 |
| WO | 00/27508 A1 | 5/2000 |

\* cited by examiner

CATALYST COMPOSITION FOR EXHAUST GAS PURIFICATION AND EXHAUST GAS PURIFYING CATALYST FOR AUTOMOBILES

TECHNICAL FIELD

The present invention relates to a catalyst composition for exhaust gas purification and a catalyst for exhaust gas purification for automobiles, and in more detail, the present invention relates to the catalyst composition for exhaust gas purification and the catalyst for exhaust gas purification for automobiles superior in purification performance for nitrogen oxides ($NO_x$), carbon monoxide (CO), and hydrocarbons (HC) in exhaust gas discharged from, in particular, a gasoline vehicle, and suitable as a three way catalyst (TWC).

BACKGROUND ART

In a catalyst apparatus for purifying exhaust gas discharged from an internal combustion engine of an automobile or the like, various catalysts have been used in response to object thereof. As a major catalyst component thereof, there is a platinum group metal, and usually it is used by being supported, in high dispersion, onto a refractory inorganic oxide having high surface area, such as activated alumina (refer to PATENT DOCUMENT 1).

As for the platinum group metal as the catalyst component, platinum (Pt), palladium (Pd), and rhodium (Rh) have been known, which have been used widely as the catalyst for purifying exhaust gas discharged from an internal combustion engine of an automobile or the like. In the aforementioned TWC, a catalyst activated species superior in oxidation activity, of Pt, Pd or the like, and Rh superior in purification activity for $NO_x$ are used in combination, in many cases. In recent years, regulations on hazardous substances contained in exhaust gas, in particular, $NO_x$, have become more and more severe. Accordingly, it is necessary to use effectively Rh superior in purification activity for $NO_x$, as the catalyst component, however, Rh is scarce in production amount and high price, which has caused price hike in recent market. Therefore, it is preferable to decrease used amount of Rh, as a catalyst activated specie, in view of resource protection, as well as cost.

In addition, as for the catalyst for purifying exhaust gas, to attain enhancement of further purification performance, the addition of various promoter components, other than the platinum group metal, to the catalyst has been investigated. As these promoter components, an Oxygen Storage Component (OSC), or an alkaline earth metal or zirconium oxide, zeolite and the like have been known.

Among these, OSC is the one which stores and discharges oxygen in exhaust gas, and cerium oxide has been known. Cerium oxide stores oxygen as $CeO_2$, when oxygen concentration in exhaust gas is high, and discharges oxygen by being converted to $Ce_2O_3$, when oxygen concentration is low. Oxygen discharged is activated oxygen, which promotes purification of HC and CO, by being utilized in oxidation action by Pt or Pd. In addition, OSC also acts to mitigate oxygen concentration change in exhaust gas, by storage and discharge of oxygen. By this action, purification performance for exhaust gas is enhanced in TWC. TWC is the one which performs oxidation and reduction by one catalyst, and has a range of exhaust gas components suitable for purification. This range is called a window, and air/fuel ratio is controlled so as to attain theoretical air-fuel ratio, called stoichiometry. By mitigating change in oxygen concentration by oxygen storage•discharge of OSC, when oxygen concentration in exhaust gas is out of this theoretical range, exhaust gas components are maintained in this window region, and purification of exhaust gas can be performed effectively.

As such a cerium oxide, a pure cerium oxide can also be used, however, it is often used as a composite oxide with zirconium (refer to PATENT DOCUMENT 2). A cerium-zirconium composite oxide is said to have high heat resistance and high storage and discharge rate of oxygen. The reason is considered that a crystal structure of the cerium-zirconium composite oxide is stable, and also does not inhibit action of a cerium oxide, which is a main OSC component, thus functions as the OSC up to inside of the particle.

On the other hand, in purification of $NO_x$ by Rh, it is considered that, for example, a steam reforming reaction and a CO+NO reaction are promoted via the Rh component as shown below and to purify $NO_x$.

$$HC+H_2O \cdots \rightarrow COx+H_2 \qquad (1)$$

$$H_2+NO_x \cdots \rightarrow N_2+H_2O \qquad (2)$$

$$CO+NO \cdots \rightarrow CO_2+1/2 N_2 \qquad (3)$$

And, it has become known technology that the zirconium oxide promotes the steam reforming reaction and the CO+NO reaction, when it is used together with the Rh component (refer to PATENT LITERATURE 3).

As the promoter component, other than this, an alkaline earth metal such as a Ba component or the like has also been known (refer to PATENT LITERATURE 4). The Ba component temporarily stores $NO_x$ contained in exhaust gas, and purifies the stored $NO_x$ by reducing to $N_2$ by a reducing component contained in exhaust gas.

In general, $NO_x$ is generated in a large quantity, when fuel supplied to an engine is less, amount of air is more, or combustion temperature is high. The Ba component temporarily absorbs $NO_x$ generated in this way.

And, $NO_x$ absorbed onto the Ba component is discharged from the Ba component, when $NO_x$ concentration becomes low, and CO concentration becomes high in exhaust gas. This is caused by a reaction of $Ba(NO_3)_2$ with CO to be converted to $BaCO_3$, and can be said chemical equilibrium. $NO_x$ discharged from the Ba component, as described above, is purified by reduction, by a reaction with a reducing component at the Rh component surface.

Such a promoter component may be used in combination of two or more and, for example, there has been known TWC, where the Ba component (barium acetate or barium nitrate) and cerium oxide are used (refer to PATENT LITERATURE 5), or TWC where barium sulfate and a cerium-zirconium composite oxide are used, proposed by the present inventor, are used (refer to PATENT LITERATURE 6).

However, it has been reported that purification performance is decreased when a combination of catalyst materials is wrong and, for example, presence of the Rh component and the Ba component in the same composition decreases purification performance for $NO_x$ (refer to PATENT LITERATURE 7). The reason for this is considered that, because the alkaline earth metal component has action of storing $NO_x$, purification action for $NO_x$ in the Rh component is interfered, or an oxidized Rh structure is stabilized by electron donating action from Ba to Rh.

Therefore, it has been proposed to enhance purification performance for $NO_x$ and heat resistance, by supporting the Rh component and the Ba component onto alumina in a separated state (refer to PATENT LITERATURE 8). In this Literature, there is no description on what degree the Rh component and the Ba component are separated in the catalyst layer, however, in the case of using water-soluble Ba acetate as a Ba source, the Ba component dissolves into slurry, and thus it cannot be said that it is sufficiently separated from the Rh component. As a result, the Rh component and the Ba component come close and thus purification performance for $NO_x$ results in to be decreased.

In addition, there have been challenged a method for adding a rare earth oxide, such as neodymium oxide, praseodymium oxide, to alumina, in order to enhance heat resistance of alumina, which is a base material, and $CeO_2$, which is an OSC component (refer to PATENT LITERATURE 9), or adding a rare earth oxide such as lanthanum oxide, neodymium oxide, to cerium oxide (refer to PATENT LITERATURE 10), as well as supporting Rh, Pd or the like, which is a noble metal, onto both of alumina particles having heat resistance enhanced by lanthanum oxide, zirconia or the like, and $CeO_2$ fine particles having heat resistance enhanced by neodymium oxide, zirconia or the like (refer to PATENT LITERATURE 11).

Other than this, there has been challenged to coat zirconia with an oxide of a metal selected from a group consisting of iron, gallium, scandium, aluminum, indium, lutetium, ytterbium, thulium, yttrium and holmium, in the case of using zirconia, as a base material, to suppress a solid solution of Rh, so as to suppress easy transfer of Rh to the zirconia surface and particle growth (refer to PATENT LITERATURE 12). In this way, particle growth or transfer can be suppressed by forming a relatively thin metal oxide layer on zirconia, and generating interaction between Rh and these meta oxides, however, in the case of forming an alumina layer, particle growth and transfer suppression effect of Rh has not been obtained, as compared with the case of forming an oxide of iron, gallium, scandium or the like.

In this way, there are various combinations of the catalyst components, and complicated reaction routes are taken by mutual interaction of the catalyst components, and thus by overall investigation on these, a combination of the catalyst components which exerts purification action most has been searched.

In addition, in order to exert catalytic performance effectively, countermeasure has been taken such as the catalyst is arranged separately in exhaust gas, at the upstream side and the downstream side, or a plurality of the catalyst layers are installed at a substrate surface.

This aims at well utilization of characteristics of the catalyst for purifying exhaust gas, in response to strengthening of exhaust gas regulations. For example, each optimum position is required to be set for the noble metal of platinum, palladium or rhodium, in response to durability (heat resistance, atmosphere resistance, poisoning resistance), catalyst characteristics (oxidation activity, reduction activity) or the like, therefore Rh or Pt/Rh is arranged at the surface layer, and Pd or Pd/Rh is arranged at the lower layer.

However, exposure to high temperature exhaust gas from an engine may sometimes results in transfer of Rh arranged at the surface layer to the lower layer, or decrease in catalytic performance, caused by particle growth.

Still more, regulations on exhaust gas have become severer and severer in recent years, and advent of such a catalyst has been desired that enables to exert more superior purification performance for exhaust gas, by using a plurality of catalysts, or by using a catalyst having a plurality of catalyst layers. Among exhaust gas, regulation value for, in particular, NO in exhaust gas has become severer, however, the conventional TWC could incur not only decrease in purification performance for $NO_x$, by transfer of Rh from the surface layer having high gas contact to the lower layer, but impair of Pd performance, by making an alloy with Pd at the lower layer, as described above.

CITATION LIST

Patent Literature

PATENT LITERATURE 1: JP-A-05-237390
PATENT LITERATURE 2: JP-B-06-75675
PATENT LITERATURE 3: JP No. 2000/027508
PATENT LITERATURE 4: JP-A-2007-329768
PATENT LITERATURE 5: JP-A-03-106446
PATENT LITERATURE 6: JP-A-2010-22918
PATENT LITERATURE 7: JP-A-2002-326033
PATENT LITERATURE 8: JP-A-09-215922
PATENT LITERATURE 9: JP-A-61-38626
PATENT LITERATURE 10: JP-A-64-4250
PATENT LITERATURE 11: JP-A-2011-200817
PATENT LITERATURE 12: JP-A-2007-98251

SUMMARY OF INVENTION

Technical Problem

In view of the above conventional problems, it is an object of the present invention to provide a catalyst for purifying harmful substances ($NO_x$, CO and HC) contained in exhaust gas discharged from an internal combustion engine of an automobile or the like, in particular, an catalyst composition for exhaust gas purification and an catalyst for exhaust gas purification for automobiles suitable as the TWC catalyst.

Solution to Problem

The present inventors have intensively studied a way to solve the above conventional problems and found that by installing a honeycomb structure-type catalyst, which is coated with a catalyst composition including an α-alumina ($Al_2O_3$) particle and rhodium (Rh) catalyst component using a zirconia ($ZrO_2$)-type base material, as a substrate, in a passage of exhaust gas discharged from an internal combustion engine of a gasoline vehicle or the like, to configure an exhaust gas purification catalyst apparatus for automobiles for purifying nitrogen oxides ($NO_x$), carbon monoxide (CO), and hydrocarbons (HC), and when exhaust gas is passed on this, decrease in the purification performance for NOx, CO, and HC can be suppressed, because transfer of the Rh particles is suppressed any more, even in exposure to high temperature exhaust gas for a long period of time, due to a part of rhodium (Rh) particles makes a solid solution with the α-alumina ($Al_2O_3$) particle present at the vicinity, even when rhodium (Rh) particles initiate transfer on the zirconia ($ZrO_2$)-type base material, and have thus completed the present invention.

That is, according to a first aspect, there is provided an catalyst composition for exhaust gas purification for purifying nitrogen oxides ($NO_x$), carbon monoxide (CO), and hydrocarbons (HC) in exhaust gas, comprising a catalyst composition wherein rhodium (Rh) is supported, together with an α-alumina ($Al_2O_3$) particle, on a zirconia ($ZrO_2$)-type base material, characterized in that average particle size of the α-alumina particle is 10 nm to 1 μm, and is smaller than average particle size of the zirconia-type base material.

In addition, according to a second aspect of the present invention, in the first aspect, there is provided the catalyst composition for exhaust gas purification, characterized in that the zirconia-type base material comprises one or more kinds selected from ceria ($CeO_2$), neodymium oxide ($Nd_2O_3$), praseodymium oxide ($Pr_6O_{11}$), lanthanum oxide ($La_2O_2$) or yttrium oxide ($Y_2O_2$).

In addition, according to a third aspect of the present invention, in the first aspect, there is provided, the catalyst composition for exhaust gas purification, characterized in that content of α-alumina to be supported on the zirconia-type base material is 5 to 60% by weight.

In addition, according to a fourth aspect of the present invention, in the first aspect, there is provided, the catalyst composition for exhaust gas purification, characterized in that BET specific surface area of α-alumina is 20 $m^2/g$ or smaller.

In addition, according to a fifth aspect of the present invention, in any of the first to the fourth aspects, there is provided a catalyst for exhaust gas purification for automobiles, characterized in that the catalyst composition for exhaust gas purification is coated, as a catalyst layer, on an integral structure-type substrate.

In addition, according to a sixth aspect of the present invention, in the fifth aspect, there is provided the catalyst for exhaust gas purification for automobiles, characterized by being coated with a catalyst layer comprising a noble metal different from rhodium, other than the above catalyst layer.

In addition, according to a seventh aspect of the present invention, in the sixth aspect, there is provided the catalyst for exhaust gas purification for automobiles, characterized in that the above noble metal is palladium (Pd) and/or platinum (Pt).

Still more, according to an eighth aspect of the present invention, in any of the fifth to the seventh aspects, there is provided the catalyst for exhaust gas purification for automobiles, characterized in that total coated amount of the catalyst composition is 100 to 350 g/L per unit volume of the integral structure-type substrate.

Advantageous Effects of Invention

The catalyst composition for exhaust gas purification of the present invention is superior in purification activity for nitrogen oxides ($NO_x$), carbon monoxide (CO), and hydrocarbons (HC), and exerts high purification performance for exhaust gas discharged from an internal combustion engine such as a gasoline engine.

Further, because the catalyst for exhaust gas purification for automobiles of the present invention is superior in durability, used amount of an expensive activated noble metal can be saved, which not only can utilize effectively a noble metal resource but also can supply an exhaust gas purification apparatus stably.

DESCRIPTION OF EMBODIMENTS

Hereafter, explanation will be given in detail on the catalyst composition for exhaust gas purification of the present invention, where a rhodium particle is supported on the zirconia-type base material, together with an α-alumina particle, and the catalyst for exhaust gas purification for automobiles including said catalyst composition It should be noted that description will be made mainly on an embodiment in a gasoline engine, however, the present invention is not limited to automotive applications, and it is applicable widely to removal technology of nitrogen oxides, carbon monoxide, and hydrocarbons in exhaust gas.

1. Catalyst Composition for Exhaust Gas Purification

The catalyst composition for exhaust gas purification of the present invention (hereafter it may be referred to as a catalyst composition simply) is the one, where rhodium (Rh) and α-alumina ($Al_2O_3$) are supported on the zirconia-type base material, that is, zirconia ($ZrO_2$) including one or more kinds selected from ceria ($CeO_2$), neodymium oxide ($Nd_2O_3$), praseodymium oxide ($Pr_6O_{11}$), lanthanum oxide ($La_2O_2$) and yttrium oxide ($Y_2O_2$), and α-alumina is present as a particle, having an average particle size of 10 nm to 1 μm, so as to surround rhodium.

(1) Zirconia-Type Base Material

In the present invention, the zirconia-type base material is a kind of a porous inorganic oxide, and functions as a base material for supporting Rh, which is a noble metal, in high dispersion.

Raw material powder of the zirconia-type base material is a known material, and is the one made of a crashed oxide particle, for example, obtained by calcining one or more kinds of an inorganic or organic zirconium compound at 450 to 600° C. in the atmosphere.

However, pure zirconium is monoclinic crystal at room temperature, whose crystal structure causes phase transition to tetragonal crystal or cubic crystal by raising temperature. Phase transition from monoclinic crystal to tetragonal crystal occurs at 1,000° C., and in this phase transition, volume thereof shrinks by about 4%. Therefore, repeated temperature rising and lowering results in destruction of zirconia.

To avoid this, oxygen vacancy is formed in the structure by making a solid solution of an alkaline earth oxide such as calcium oxide or magnesium oxide, or a rare earth oxide such as yttrium oxide in zirconia, resulting in a stable or semi-stable state of cubic crystal and tetragonal crystal, even at room temperature, which thus enables to suppress destruction by temperature rising and lowering. Zirconia added with such an oxide (it is called a stabilizer) is called stabilized zirconia or partially stabilized zirconia.

In practical applications, because the catalyst for exhaust gas purification repeats frequently cycle between high temperature and low temperature, zirconia is never used alone but used in specifications having superior heat resistance by making composite with an alkaline earth oxide or a rare earth oxide such as the above.

In the present invention, it is preferable that the zirconia-type base material contains one or more kinds of an element selected from Ce, Nd, Pr, La, and Y, as an oxide, in an amount of 1 to 60% by weight. The amount of one or more kinds of a rare earth element selected from Ce, Nd, Pr, La, and Y less than 1% by weight, based on an oxide, becomes difficult to exert synergy effect with zirconia by adding the rare earth element, while the amount of the rare earth element over 60% by weight, based on an oxide, becomes difficult to exert promotion effect of a steam reforming reaction or a CO+NO reaction, which zirconia has as a base material for supporting rhodium, and thus it is not preferable.

Particles of the zirconia-type base material of the present invention is not especially limited by particle size, however, for example, average particle size is preferably 100 nm to 50 µm, more preferably 100 nm to 30 µm, and particularly preferably 200 nm to 20 µm. The particle size of the zirconia-type base material below 100 nm makes difficult for gas to diffuse inside a pore inside the granulated particle, due to narrowing of pore size inside the granulated particle in granulation together with the α-alumina particle, and becomes difficult for Rh, which is supported at the vicinity of the center part inside the granulated particle, to contribute to purification activity, and thus it is not preferable. On the other hand, the particle size over 50 µm requires longer time in gas diffusion to the vicinity of the center part inside the particle, which could become difficult for Rh, which is supported at the vicinity of the center part of the particle, to contribute to purification activity.

In addition, because the zirconia-type base material is required to support α-alumina in order to suppress transfer of rhodium on the surface thereof, average particle size of the zirconia-type base material is essentially larger than average particle size of α-alumina.

(2) Rhodium (Rh)

In the present invention, rhodium of a noble metal element, functions as activated metal for a denitration reaction. Rhodium is supported on the above zirconia-type base material, and as a starting salt to be used in that occasion, rhodium nitrate, rhodium chloride, rhodium acetate, rhodium sulfate, or the like is preferable. In particular, use of rhodium nitrate and rhodium acetate is preferable, where residue of chlorine or sulfide or the like does not remain after calcining.

Average particle size of the rhodium particles is preferably 100 nm or smaller, more preferably 80 nm or smaller, and still more preferably 50 nm or smaller. The average particle size of the rhodium particles over 100 µm deteriorates diffusion performance, and also decreases catalytic performance, and thus it is not preferable. By setting particle size of the rhodium particle 100 nm or smaller, it becomes possible for the rhodium particle to be positioned at the vicinity so as to be surrounded by the α-alumina particle.

Supported amount of rhodium onto zirconia containing at least one of ceria, neodymium oxide, praseodymium oxide, lanthanum oxide and yttrium oxide is not especially limited, however it is preferably from 0.05 to 2.0% by weight, and more preferably from 0.1 to 1.5% by weight. The amount of rhodium less than 0.05% by weight abruptly decreases denitration performance, while the amount over 2% by weight is not preferable in view of decreasing enhancement effect of purification performance comparable to the increased amount, as well as effective utilization of the resource, although there is no problem in view of purification performance.

(3) α-Alumina

In the present invention, α-alumina is a kind of an inorganic oxide, and functions as a blocking material for suppressing particle growth and transfer of Rh, which is a noble metal.

α-Alumina is largely different in making a solid solution with Rh, as compared with other alumina (a δ-type, a θ-type) including γ-alumina. γ-Alumina or the δ-type or the θ-type alumina having large BET specific surface area makes a solid solution with Rh partially (the γ-type has the largest degree of easiness of making a solid solution, followed by the δ-type and the θ-type in this order), while α-alumina has smaller BET specific surface area and has been said difficult to make a solid solution with Rh (refer to R&D Review, Vol. 32, No. 1 (1997. 3), pages 75 to 82, published by Toyota Central Research).

In the present invention, because the α-alumina particle, by utilization of small degree in making a solid solution with the Rh particle, is supported at the vicinity of the Rh particle on the zirconia-type base material, when the Rh particle initiates to transfer by being exposed to high temperature exhaust gas, and a part thereof makes a solid solution by contacting with the α-alumina particle present at the vicinity, the α-alumina particle exerts a role of an anchoring (like an anchor of a ship), that is, a blocking material on the zirconia-type base material, thus inhibits transfer of the Rh particle anymore and prevents sintering of the Rh particles themselves. On the other hand, because the most part of the Rh particles, which is suppressed particle growth, has not made a solid solution with α-alumina, purification performance of Rh itself is maintained.

Accordingly, it is desirable that the α-alumina particle is supported as close as possible to the Rh particle, and dispersed as highly as possible on the base material.

By the way, as described above, PATENT LITERATURE 12 has described that by forming a relatively thin layer of a metal oxide of iron, gallium, scandium or aluminum, or the like on zirconia, and generating interaction between Rh and these metal oxides, growth or transfer of a particle can be suppressed.

In addition, in Comparative Example 4 of this PATENT LITERATURE 12, the case of coating alumina on zirconia has been shown, however, it is speculated that alumina is the γ-type, because alumina nitrate nonahydrate is used, as a staring raw material, and is calcined at 500° C. Although this coating of γ-alumina was able to suppress growth of the Rh particle, in the same degree as in the case of Example, that is the case of coating of the metal oxide of gallium, scandium, indium, or the like, exhaust gas purification performance was not so much improved as compared with the case of coating the metal oxide of Example, including gallium. This suggests that, although transfer of Rh and sintering thereby (particle growth) can be prevented by making a partial solid solution of Rh to γ-alumina, catalytic activity of Rh is lowered by making a solid solution of Rh to γ-alumina.

In the present invention, the α-alumina particle is smaller than that of the zirconia particle, and average particle size thereof is 10 nm to 1 µm. The average particle size is preferably 10 to 800 nm and more preferably 20 to 500 nm. The average particle size of α-alumina below 10 nm loses effective functioning of the α-alumina particle as an anchoring material, due to too small part of making a solid solution of the α-alumina particle with the rhodium particle, and thus it is not preferable. On the other hand, average particle size of α-alumina over 1 µm forms too large void among the particles, and the rhodium particle passes through the gap thereof, and this case also loses effective functioning as a blocking material, and thus it is not preferable. Therefore, it is preferable that the α-alumina particle to be used is the fine particulate one, and it is preferable to use α-alumina treated to a fine particulate state, in advance, or to make a fine particle by making slurry of a coarse particle-state α-alumina by adding water, and using a crushing apparatus such as a ball mill, a beads mill.

BET specific surface area of α-alumina is not especially limited, however, it is preferably 20 $m^2/g$ or smaller, more preferably 0.1 to 20 $m^2/g$, and still more preferably 0.1 to 10 $m^2/g$. BET specific surface area over 20 $m^2/g$ promotes making a solid solution with the Rh particle, and decreases catalytic activity of Rh, and thus it is not preferable.

Supported amount of α-alumina onto the zirconia-type base material is not especially limited, but it is preferably 5 to 60% by weight, more preferably 5 to 50% by weight, and particularly preferably 5 to 40% by weight. The supported amount of α-alumina less than 5% by weight provides inferior effect of blocking the Rh particles, while the amount more than 60% by weight could excessively coat the Rh particles to interfere gas diffusion to the Rh particle, and thus it is not preferable.

In this way, by setting particle size of the α-alumina particle to 10 to 1 μm, and supported amount of α-alumina onto the zirconia-type base material to 5 to 60% by weight, it becomes possible to locate the rhodium particle, in which supported amount is 0.05 to 2.0% by weight, so that α-alumina surrounds it, at the vicinity.

The catalyst composition for exhaust gas purification of the present invention can be used as a structure-type catalyst in which various kinds of substrate surfaces are coated with the above catalyst component. Here, shape of the substrate is not especially limited, and can be selected from a structure-type substrate of such as prism, cylinder, sphere, honeycomb, sheet-type or the like. The size of the structure-type substrate is not especially limited, and the one having, for example, a diameter (length) of from several millimeters to several centimeters can be used, as long as it is any of the prism, cylinder, and sphere-type one.

2. Catalyst for Exhaust Gas Purification for Automobiles

The catalyst for exhaust gas purification for automobiles of the present invention (hereafter, it may also be referred to a catalyst simply) is the one wherein a material containing the zirconia-type base material, in which rhodium and α-alumina are supported, coats a honeycomb-structure substrate in one or more layer.

In addition, one or more kinds of the noble metal such as palladium or platinum can be added other than rhodium, and in that case, said noble metal may be present in the same layer together with rhodium, or it may be present in a different layer. Further, a barium compound or a binder or the like can also be added, and in that case, it is preferable that the barium compound is forced to be present in a different layer from rhodium, or in the case of presence in the same layer, it is preferable that both do not contact directly, by supporting rhodium and the barium compound onto different base materials.

In order to configure the catalyst for exhaust gas purification for automobiles, the following materials are required other than the above catalyst composition for exhaust gas purification.

(1) Alumina Other than α-Alumina

In the present invention, alumina is one kind of the porous inorganic oxide, and functions as a base material for supporting Pd or Pt, other than Rh, which is the noble metal, in a highly dispersed state. Other than γ-alumina, there is included θ-alumina, δ-alumina, or the like, and alumina having large BET specific surface area is preferable.

α-Alumina, because of having a small BET specific surface area of 20 $m^2/g$ or smaller, differs in the above object, and is not preferable as a base material for supporting Rh, Pd and Pt in a highly dispersed state. However, the BET specific surface area of 300 $m^2/g$ or larger provides too small pore size inside the particle, and delays gas diffusion inside the pore, and thus it is not preferable. BET specific surface area of alumina is preferably 20 to 250 $m^2/g$, more preferably 80 to 250 $m^2/g$, and still more preferably 100 to 200 $m^2/g$.

In addition, average particle size of alumina is preferably 50 μm or smaller, and more preferably 40 μm or smaller. The average particle size of alumina over 50 μm delays gas diffusion to the center part of the particle, and the center part of the alumina particle cannot be utilized effectively, and thus it is not preferable.

In addition, alumina may be used alone, or in order to enhance heat resistance, a rare earth element such as La, Ce, Nd, Pr, an alkaline earth metal such as Ba, Mg may be added, or also in order to suppress to make a solid solution with Rh, it may be coated with an oxide of Zr, Ti or the like. In this case, supported amount is preferably 1 to 60% by weight in an oxide equivalent. The amount lower than 1% by weight makes difficult to exert synergy effect of the added elements and alumina, and thus it is not preferable. In addition, the amount over 60% by weight makes difficult to maintain large BET specific surface area of alumina as the base material, and thus it is not preferable.

(4) Palladium (Pd)

In the present invention, palladium, which is a noble metal element, functions as an activated metal, similarly as rhodium, to a purification reaction for HC, CO, NO or the like.

Palladium can be supported on the above alumina or the zirconia-type base material, and as a starting salt to be used in that occasion, palladium nitrate, palladium chloride, dinitro diammine palladium, or the like is preferable. In particular, use of palladium nitrate and dinitro diammine palladium is preferable, which does not leave residue of chlorine, a sulfide or the like after calcining.

Supported amount of palladium onto the zirconia-type base material is preferably 0.05 g/L to 4.0 g/L, and more preferably 0.1 to 2.0 g/L. The amount of palladium less than 0.05 g/L decreases abruptly purification performance for HC, CO, NO or the like, while the amount more than 4.0 g/L is not preferable in view of decreasing enhancement effect of purification performance comparable to the increased amount, as well as effective utilization of the resource, although there is no problem in purification performance.

(3) Platinum (Pt)

In the present invention, as other activated metal to a purification reaction for HC, CO, NO or the like, platinum of a noble metal, can also be used.

As a starting salt to be used in that occasion, chloro platinate (IV), diammine platinum (II) nitrite, amine hydroxide palatinate, chloro platinate, platinum nitrate, or the like is preferable. In particular, use of diammine platinum (II) nitrite, an amine hydroxide palatinate solution, platinum nitrate or the like is preferable, which does not leave residue of chlorine or sulfide or the like after calcining.

Supported amount of platinum is preferably 0.05 to 2.0 g/L, and more preferably 0.1 to 1.5 g/L. The amount of platinum less than 0.05 g/L decreases abruptly purification performance for HC, CO or the like, while the amount more than 2.0 g/L is not preferable in view of decreasing enhancement effect of purification performance comparable to the increased amount, as well as effective utilization of the resource, although there is no problem in purification performance.

(4) Barium Compound

In the present invention, barium has suppression effect of particle growth of palladium by interaction with the noble metal. In addition, because barium is additionally capable of temporarily adsorbing $NO_x$ under high temperature oxidative atmosphere, it is useful also as a promoter of purification for $NO_x$.

A form of the barium compound is not especially limited, and water-soluble barium acetate, barium hydroxide, barium oxide, barium chloride, or the like, as well as insoluble barium sulfate or barium carbonate, or the like can be used.

(5) Binder

In the present invention, a binder such as alumina sol can be used to bind each particle by adhering to a base material particle or a promoter particle.

Alumina sol is composed of fine particles of from several tens nm to several μm, and adheres and binds with the base material particle or the promoter particle. Amount of the binder is not especially limited, and even a small amount is not a problem in particular, as long as the catalyst does not peel off from the honeycomb structure even after durability treatment.

As the binder, various kinds of sol such as silica sol, zirconia sol or titania sol can be included, other than alumina sol. In addition, a soluble salt such as aluminum nitrate, aluminum acetate, zirconium nitrate, zirconium acetate or the like can also be used. Other than these, acids such as acetic acid, nitric acid, hydrochloric acid, sulfuric acid can also be used.

Other than these, alumina ($\alpha$-, $\gamma$-, $\theta$-, $\delta$-alumina) described in the above or the zirconia-type base material or the like can also be used as the binder by milling them as it is.

It is preferable that the catalyst for exhaust gas purification of the present invention is used as an integral structure-type catalyst wherein the above catalyst component is coated onto honeycomb-like substrate surface. Size of the honeycomb-like integral structure-type substrate is not especially limited, and the one having a diameter (length) of, for example, from several millimeters to several centimeters can be used.

(6) Honeycomb Structure Substrate

The honeycomb structure substrate means such one as composed of ceramics such as cordierite, silicon carbide, silicon nitride, or a metal such as stainless steel, and the structure thereof has many parallel fine gas passages extending over the whole structure substrate. As a material, cordierite is preferable in view of durability and cost.

In addition, number of holes at the opening part of such a honeycomb structure substrate is determined in a proper range, in consideration of kind of exhaust gas to be processed, gas flow rate, pressure drop or removing efficiency or the like. Cell density thereof is preferably from 100 to 900 cells/inch$^2$ (15.5 to 139.5 cells/cm$^2$), and more preferably from 200 to 600 cells/inch$^2$ (31 to 93 cells/cm$^2$). The cell density over 900 cells/inch$^2$ (139.5 cells/cm$^2$) tends to cause clogging by adhered particle-like materials (PM), while the cell density below 100 cells/inch$^2$ (15.5 cells/cm$^2$) makes geometrical surface area small, causing decrease in effective utilization rate of the catalyst. It should be noted that the cell density means cell number per unit surface area in cross-section, when the honeycomb structure substrate is cut perpendicular to a gas passage.

In addition, as the honeycomb structure substrate, there has been known a flow-through-type structure, where gas passages are communicated, and a wall-flow-type structure, where a part of the end face of the gas passage is closed, and also gas is able to flow through the wall face of the gas passage. The flow-through-type structure provides less air resistance and smaller pressure drop of exhaust gas. In addition, the wall-flow-type structure is possible to filter off particle-like components included in exhaust gas. The exhaust gas purifying catalyst of the present invention can be used in either of these structures.

(7) Layer Configuration

The catalyst for exhaust gas purification for automobiles of the present invention is the one where the above catalyst composition is coated onto the honeycomb structure substrate in one or more layer. Layer configuration may be one layer, however, it is preferable to enhance exhaust gas purification performance by providing two or more layers.

Specifically, the catalyst composition of the present invention suppresses particle growth of the rhodium particle or transfer thereof to other base material, by supporting $\alpha$-alumina on to the zirconia-type base material, and by blocking transfer of rhodium on the zirconia surface under a high temperature. That is, according to the present invention, because rhodium is stably present on zirconia at high temperature, in either of the case of being mixed with a base material on which other noble metal is supported in a single layer state, or the case of taking a multilayer structure with the base material on which other noble metal is supported in a two or more layer state, superior purification characteristics for $NO_x$, CO, HC, can be maintained.

In the case of two or more layers, barium is required to be present in a layer different from the layer of the above catalyst composition including Rh. For example, it is preferable that the above catalyst composition is arranged at the upper layer, by setting a layer including barium at the lower layer. In addition, presence of barium and Pt and/or Pd in the same layer enables to exert superior catalytic performance.

In the present invention, total coated amount of the catalyst composition is preferably from 50 to 300 g/L, and more preferably from 100 to 250 g/L. The amount less than 50 g/L deteriorates dispersion property of the noble metal such as Rh to be supported, accompanied with decrease in amount of the base material, as well as decreases amount of the OSC material, which decreases purification performance for harmful components (HC, CO, $NO_x$), and thus it is not preferable, while the amount more than 300 g/L narrows inside the cell, which increases pressure drop and increases load to an engine, and thus it is not preferable.

3. Preparation Method for Catalyst (1) Preparation Method for Catalyst Composition In order to prepare the catalyst composition for exhaust gas purification of the present invention, supporting of $\alpha$-alumina on to the zirconia-type base material can adopt, for example, the following methods.

(Process 1)

Slurry including fine particles of $\alpha$-alumina, and slurry including the zirconia-type base material are mixed to coat and support $\alpha$-alumina onto the zirconia-type base material, using a drying apparatus such as a spray dryer, a fluid-bed spray dryer, a high speed stirring dryer, or the like. As the slurry, other than the above, slurry obtained by wet-type crushing of $\alpha$-alumina till attaining fine particles using a crushing apparatus such as beads mill, or slurry obtained by wet-type crushing of the zirconia-type base material till attaining predetermined particle size using a crushing apparatus such as beads mill, can be used.

(Process 2)

In the process 1, using boehmite or $\gamma$-alumina or the like instead of $\alpha$-alumina, and after coating this onto the zirconia-type base material, by calcining at high temperature this alumina-supported zirconia-type base material, alumina is converted to α-alumina.
(Process 3)

In the process 1, using a dispersed solution where aluminum nitrate is dissolved instead of α-alumina, and mixing with slurry including the zirconia-type base material, aluminum hydroxide is precipitated on to the zirconia-type base material particle, using an alkaline solution such as ammonia water, sodium hydroxide or the like. Next, by high temperature treatment of the alumina-supported zirconia-type base material obtained by filtering, drying this, and calcining, for example, at 600° C., alumina is converted to α-alumina.
(Process 4)

Using a combination of two or more of the above process 1, process 2 or process 3, α-alumina is supported onto the zirconia-type base material.

After that, Rh is supported onto α-alumina-supported zirconia-type base material, obtained by any of the above methods. Rh can be supported, using an Rh salt such as Rh nitrate, Rh chloride, by a method such as a water absorbing supporting method, an adsorbing supporting method.

(2) Preparation Method for Integral Structure-Type Catalyst

In order to prepare the catalyst for exhaust gas purification for automobiles of the present invention, the above catalyst composition, and a binder or the like, as needed, are mixed with an aqueous medium to make a slurry-like mixture, and then it is coated onto the integral structure-type substrate, and dried and calcined.

That is, firstly, the catalyst composition and the aqueous medium are mixed in a predetermined ratio to obtain the slurry-like mixture. In the present invention, the aqueous medium may be used in such an amount that can disperse the catalyst composition uniformly in the slurry.

In this occasion, blending of an acid or an alkali for pH adjustment, or blending of a surfactant, a resin for dispersion or the like for viscosity adjustment or for enhancement of slurry dispersion property, as needed, is allowed. As a mixing method for slurry, pulverization mixing by a ball mill or the like is applicable, however, other pulverization or mixing methods may also be applied.

Next, a slurry-like mixture is coated onto the integral structure-type substrate. The coating method is not especially limited, however, a washcoat method is preferable.

By performing drying and calcining after the coating, the integral structure-type catalyst, where the catalyst composition is supported, is obtained. It should be noted that drying temperature is preferably from 70 to 200° C., and more preferably 80 to 150° C. In addition, calcining temperature is preferably from 300 to 700° C., and more preferably 400 to 600° C. Heating may be performed by known heating means such as an electric furnace or a gas furnace or the like.

4. Catalyst Apparatus for Exhaust Gas Purification

In the present invention, the catalyst apparatus is configured by arranging the above catalyst for exhaust gas purification for automobiles in an exhaustion system from an engine.

Position and number of the catalyst in the exhaust system from an engine may be designed, as appropriate, in response to exhaust gas regulations. In a vehicle whose exhaust gas regulation is not severe, use of one catalyst apparatus is possible, while in a vehicle whose exhaust gas regulation is severe, two catalysts can be used which are arranged at manifold catalyst in the exhaustion system and the under floor position at the later stage thereof.

In this occasion, layer configuration of the catalysts can be determined in response to discharge concentration of $NO_x$, CO, and FTC or an operating system, and a single layer catalyst composed of the zirconia-type base material including rhodium and α-alumina, and a single or multiple noble metals, or a multilayer catalyst composed of the zirconia-type base material including rhodium and α-alumina and a single or multiple noble metals can be used as appropriate.

EXAMPLES

Examples and Comparative Examples will be shown below, to clarify more characteristics of the present invention, however, the present invention should not be construed as limited to these Examples.

It should be noted that particle size and pore size of raw materials to be used in the catalyst composition and the catalysts to be used in the present Examples and Comparative Examples were measured by the following methods. In addition, heat treatment of the catalysts or model gas evaluation was performed by a method show below. Further, transfer amount of Rh from the upper layer to the lower layer in the catalyst after heat treatment was also measured by a method shown below.

<Measurement of Particle Size Distribution>

Particle size distribution of a powder sample was measured by a laser scattering method, using a nano-particle size distribution measurement apparatus, SALD-7100, manufactured by Shimadzu Corp., and median size (D50) thereof was adopted as average particle size.

<Measurement of Pore Distribution>

Pore distribution of the catalyst sample was measured by a mercury intrusion method, using PASCAL140-440, manufactured by Thermo Co., Ltd., after drying 0.3 g of various kinds of powder samples, and mode size (diameter) was adopted as the pore size.

<Heat Treatment Condition and Model Gas Evaluation Test I of Catalyst Composition>

The catalyst compositions obtained by the following Example 1 and Comparative Example 1 were each subjected to heat treatment (durability) at 1,000° C. for 6 hours, using an electric furnace. After that, they were subjected to an evaluation test at predetermined temperature, using the model gas reaction apparatus I.

Specifically, after mounting the catalyst already heat treated (50 mg) inside a reactor of the model gas reaction apparatus I, while flowing gas components shown in Table 1 in a GHSV (Gas Hourly Space Velocity: flow-in rate of reaction gas per unit volume of the catalyst) of 360,000/hr-g-cat (gas flow rate=300 mL/min), catalyst bed temperature was raised up to 400° C. (or 600° C.), and then fixed. By this operation, purification ratio for NO at predetermined catalyst bed temperature was calculated by the following equation, using model gas simulating A/F (air fuel ratio)=14.4 (weakly rich):

Purification ratio for NO (%)=100×{(NO concentration at the entrance)−(NO concentration at the exit)}/(NO concentration at the entrance)

TABLE 1

| Flow rate | | 300 mL/min |
|---|---|---|
| GHSV | | 360,000/hr · g-cat |
| A/F | | 14.4 |
| Components | CO | 2000 ppm |
| | $C_3H_8$ | 200 ppmC |
| | NO | 400 ppm |
| | $O_2$ | 900 ppm |
| | $H_2O$ | 2% |
| | $H_e$ | Remainder |

<Heat Treatment Condition and Model Gas Evaluation Test II of Catalyst>

The catalysts obtained by the following Examples 2 to 5, and Comparative Examples 2 to 5 were cut out to a size of (a diameter of 25.4 mm×a length of 50 mm a diameter, 25.3 mL) for a model gas evaluation catalyst, using a core drill and a diamond cutter, and after that they were heat treated at 1,000° C. for 6 hours using an electric furnace. After that, they were subjected to a temperature rising light off test, using the model gas evaluation apparatus II.

Specifically, after mounting the catalyst (a size of 25.4 mm×a length of 50 mm, 25.3 mL) already heat treated, inside a reactor of the model gas evaluation apparatus II, gas components shown in TABLE 2 were flown by switching gas in the order of "Rich-Stoichiometric-Lean-Stoichiometric", as one cycle, by each 0.25 second, in a GHSV (Gas Hourly Space Velocity: flow-in rate of reaction gas per unit volume of the catalyst) of 60,000/hr·g-cat (gas flow rate=25.3 mL/min), temperature was raised from room temperature up to 400° C. in a speed of 30° C./min. By this operation, catalyst bed temperature ($NO_xT50$, COT50, HCT50) was measured, when oxidation rate of NO, CO or HC reached to each numerical value, using model gas simulating A/F (air fuel ratio)= 14.7±0.9 and 1 Hz.

Here, $NO_xT50$ represents catalyst bed temperature, when 50% of $NO_x$ was purified, COT75 represents catalyst bed temperature, when 50% of CO was purified, and HCT50 represents catalyst bed temperature, when 50% of HC was purified.

TABLE 2

| Gas specifications | | Rich | Stoichiometry | Lean |
|---|---|---|---|---|
| Components | CO | 2.53% | 0.6% | |
| | $H_2$ | 0.85% | 0.2% | |
| | $C_3H_6$ | | 600 ppmC | |
| | NO | | 0.1% | |
| | $O_2$ | | 0.6% | 1.85% |
| | $CO_2$ | | 13.9% | |
| | $H_2O$ | | 10% | |
| | $N_2$ | | Remainder | |

<Electron Probe MicroAnalyzer>

Cross-sectional distribution of a specific element inside the catalyst sample was measured using an Electron Probe MicroAnalyzer, JXA-8100, manufactured by JEOL Co., Ltd.

Example 1

300 g of α-alumina powder A, having a BET specific surface area of 157 m²/g, and water were put into a ball mill and milled till average particle size (D50) of α-alumina of 200 nm is attained to obtain slurry α.

Similarly, 690 g of neodymium oxide-zirconia powder B ($Nd_2O_3$:$La_2O_3$:$ZrO_2$=17.5:7.5:75), having a BET specific surface area of 60 m²/g and a pore size of 8 nm, and water were put into a ball mill and milled till average particle size (D50) of neodymium oxide-zirconia of 3 μm is attained to obtain slurry β.

The slurry α and the slurry β were added in a solid content ratio of 30:69 and stirred for mixing, then the mixed slurry was sprayed and dried using a spray drier, and the resultant powder was calcined at 600° C. for 2 hours to obtain α-alumina supported-neodymium oxide-zirconia powder a {average particle size (D50):10 μm} in an amount of 30.3% by weight.

On to 990 g of α-alumina supported-neodymium oxide-zirconia powder a in an amount of 30.3% by weight, an aqueous solution of Rh nitrate was impregnated and supported, so as to attain 10 g in noble metal equivalent, to obtain a catalyst composition b (neodymium oxide-zirconia powder, coated with α-alumina in an amount of 30% by weight which was supported by Rh in an amount of 1.0% by weight) of Example 1.

Specifications of the catalyst composition obtained in this Example 1 are summarized in TABLE 3. Next, after 10 g was fractionated from the catalyst composition of Example 1 obtained via the above catalyst preparation, it was subjected to heat treatment at 1,000° C. for 6 hours. After that, a purification test for NO was performed using the model gas reaction apparatus I by the above-described method, and results thereof are summarized in FIG. 1.

Comparative Example 1

A catalyst composition of Comparative Example 1 (Rh supported-neodymium oxide-zirconia powder in an amount of 1.0% by weight) was obtained similarly as in Example 1, except using neodymium oxide-zirconia powder B, instead of α-alumina supported-neodymium oxide-zirconia powder a in an amount of 30.3% by weight, in Example 1.

Specifications of the catalyst composition obtained in this Comparative Example 1 are summarized in TABLE 3.

Figure 1:
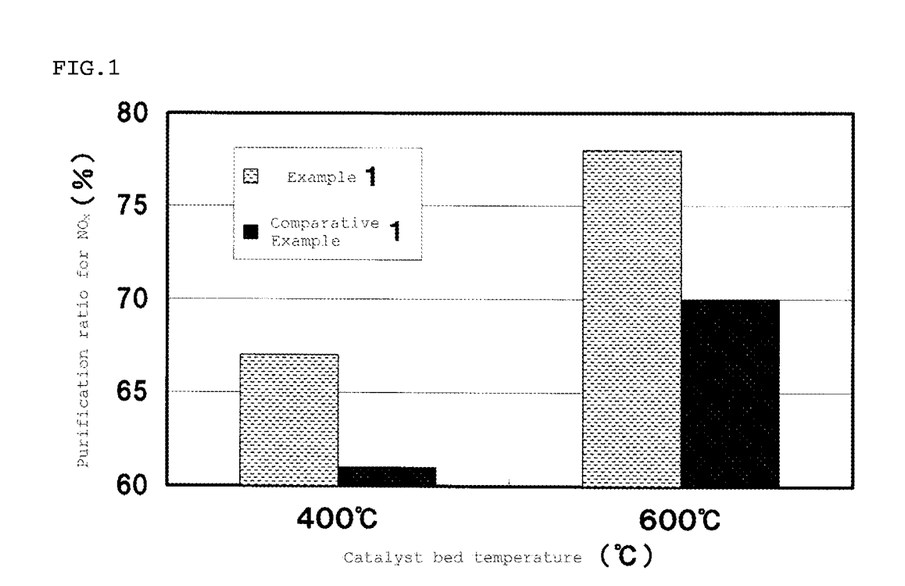
FIG. 1 is evaluation result of a purification reaction for $NO_x$ by a catalyst composition for exhaust gas purification after heat treatment at 1,000° C., and a graph showing purification ratio for $NO_x$ at a catalyst bed temperature of 400° C. and 600° C.

Next, the catalyst composition of the above Comparative Example 1 was subjected to heat treatment at 1,000° C. for 6 hours, and then a purification test for NO was performed using the model gas reaction apparatus I by the above method, and results thereof are summarized in FIG. 1.

TABLE 3

| | Catalyst composition (% by weight) | | |
|---|---|---|---|
| Specifications | Noble metal Rh | Blocking material α-alumina | Base material Neodymium oxide-zirconia |
| Example 1 | 1 | 30 | 69 |
| Comparative Example 1 | 1 | 0 | 99 |

[Evaluation Result 1]

From FIG. 1 summarizing the model gas evaluation test by the above catalyst composition after heat treatment at 1,000° C. for 6 hours, the following can be understood on purification characteristics for NO.

(Example 1) is the catalyst of the present invention where neodymium oxide-zirconia is used as a base material which supports rhodium, and supported amount of α-alumina is set at 30% by weight, and exerted superior denitration performance as compared with Comparative Example 1 which does not support α-alumina.

In this way, it was confirmed by the present invention that in the case where the base material which supports rhodium is the zirconia-type oxide, co-presence of α-alumina with neodymium oxide-zirconia enhances heat resistance of purification performance for NO by the catalyst composition.

Example 2

Lower Layer 993.8 g of γ-alumina powder C having a BET specific surface area of 150 m²/g and a pore size of 23 nm was impregnated and supported with an aqueous solution of Pd nitrate, so as to attain 6.2 g in noble metal equivalent, to obtain Pd supported-alumina powder c in an amount of 0.62% by weight.

Similarly, 996.5 g of ceria-zirconia powder D ($CeO_2$: $La_2O_3$:$ZrO_2$=45:10:45), having a BET specific surface area of 73 $m^2/g$ and a pore size of 13 nm, was impregnated and supported with an aqueous solution of Pd nitrate, so as to attain 3.5 g in noble metal equivalent, to obtain Pd supported ceria-zirconia powder d, in an amount of 0.35% by weight.

And, 500 g of Pd supported-alumina powder c in an amount of 0.62% by weight, 400 g of Pd supported-ceria-zirconia powder in an amount of 0.35% by weight, 150 g of barium sulfate having a BET specific surface area of 5 $m^2/g$, and 210 g of γ-alumina powder C were dispersed in water, and mixed using a stirrer or the like to obtain slurry γ.

Subsequently, a flow-through-type cordierite substrate {600 cell/$inch^2$ (930 k/$m^2$)/4 mil (0.1 mm), a diameter of 105.7 mm mm×a length of 81.4 mm, 714 mL}, was immersed into this slurry, and coated thus obtained slurry γ, so as to attain an catalyst supported amount of 126 g/L per unit volume. After that it was dried at 150° C. for 1 hour and calcined at 500° C. for 2 hours under atmospheric environment to obtain a catalyst already coated with the lower layer.
=Upper Layer=

α-Alumina supported-Neodymium oxide-zirconia powder e {average particle size (D50): 10 μm} in an amount of 10.05% by weight was obtained similarly as in Example 1, except by adding slurry α and slurry β, in a solid content ratio of 10:89.5, instead of α-alumina-supported neodymium oxide-zirconia powder a in an amount of 30.3% by weight, in Example 1.

Onto 995 g of α-alumina supported-neodymium oxide-zirconia powder e in an amount of 10.05% by weight, an aqueous solution of Rh nitrate was impregnated and supported with, so as to attain g in noble metal equivalent, to obtain neodymium oxide-zirconia powder f (a catalyst composition 1), which is coated with α-alumina in an amount of 10% by weight supports Rh in an amount of 0.5% by weight.

Similarly, 995 g of γ-alumina powder C was impregnated and supported with an aqueous solution of Rh nitrate, so as to attain 5 g in noble metal equivalent, to obtain Rh supported-alumina powder g (a catalyst composition 2) in an amount of 0.5% by weight.

And, 500 g of neodymium oxide-zirconia powder f, which is coated with α-alumina in an amount of 10% by weight which supports Rh in an amount of 0.5% by weight, 400 g of Rh supported-alumina powder g in an amount of 0.5% by weight, 120 g of γ-alumina powder A were added in water, and mixed using a stirrer to obtain slurry δ.

Subsequently, the above catalyst already coated with the lower layer was immersed into this slurry, and coated, so as to attain a catalyst supported amount of 102 g/L per unit volume. After that it was dried at 150° C. for 1 hour and calcined at 500° C. for 2 hours under atmospheric environment to obtain a catalyst of Example 2 (Pd=0.45 g/L, Rh=0.45 g/L, α-alumina-supported neodymium oxide-zirconia in an amount of 10% by weight, total amount of catalyst=228 g/L).

Specifications of the catalyst obtained in this Example 2 are summarized in TABLE 4.
[Model Gas Evaluation II]

The catalyst of Example 2 (a diameter of 105.7 mm×a length of 81.4 mm, 714 mL) obtained via the above catalyst preparation was cut out to a size of (a diameter of 25.4 mm×a length of 50 mm, 25.3 mL) catalyst for a model gas evaluation, using a core drill and a diamond cutter, and after that it was heat treated at 1,000° C. for 6 hours using an electric furnace. After that, it was subjected to a temperature rising light off test for $NO_x$, CO and HC, using the model gas evaluation apparatus II, and results thereof are summarized in FIGS. 2 to 4.

In addition, from the catalyst of the above Example 2 (a diameter of 105.7 mm×a length of 81.4 mm, 714 mL), two pieces with a size of 1 cm×1 cm were cut out using a diamond cutter or the like, and after that one of the pieces was heat treated (durability) at 1,000° C. for 6 hours inside an electric furnace. After that, a non-treated product and a heat treated product were imbedded in a resin, so that a cell hole can be observed each one small piece, and still more, the resin surface was polished to obtain an EPMA measurement sample (one piece initially and one piece after durability treatment). Using these catalyst samples, Rh distribution from the upper layer toward the lower layer was measured using EPMA. After only an Rh peak was cut off from thus obtained EPMA measurement chart, further the upper layer part and the lower layer part were cut and separated, and each of them was weighed to determine residual ratio of Rh present at the upper layer, which results are summarized in FIG. 5.

Figure 5:
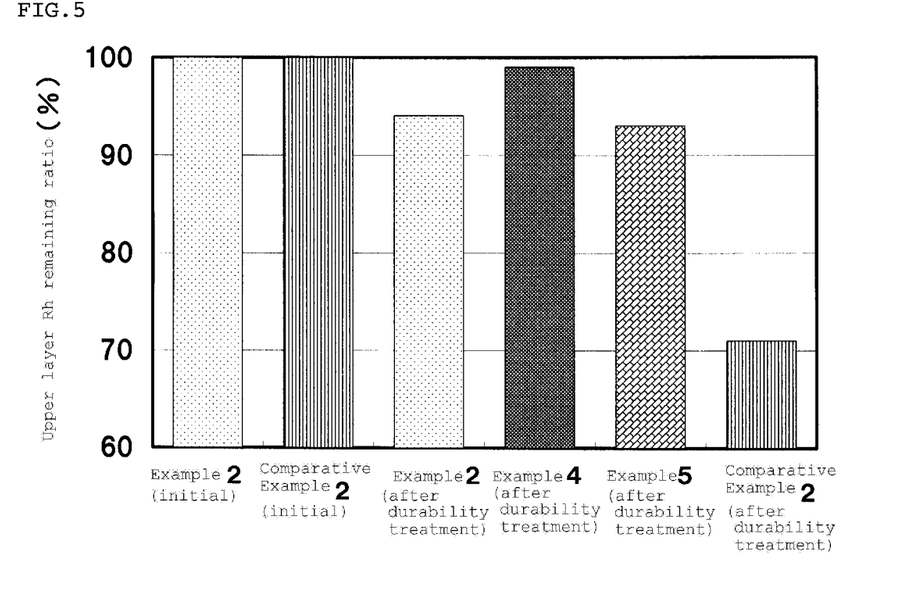
FIG. 5 is a graph showing remaining ratio of Rh in the upper layer, based on cross-section measurement result using EPMA of a catalyst for exhaust gas purification for automobiles after heat treatment at 1,000° C.

Residual ratio of Rh at the upper layer
(%)=100×(peak weight of Rh at the upper layer)/
[(peak weight of Rh at the upper layer)+(peak
weight of Rh at the lower layer)]    [MATH. 1]

Example 3

Lower Layer

A catalyst already coated with the lower layer was obtained by the same catalyst preparation method as in Example 2.
=Upper Layer=

α-alumina supported-neodymium oxide-zirconia powder h {average particle size (D50): 10 μm} in an amount of 20% by weight was used by adding slurry α and slurry β, in a solid content ratio of 20:79.5, instead of α-alumina supported-neodymium oxide-zirconia powder e in an amount of 10.05% by weight, in Example 2. Similarly as in Example 2 other than this, a catalyst (Pd=0.45 g/L, Rh=0.45 g/L, α-alumina supported-neodymium oxide-zirconia in an amount of 20% by weight, total amount of catalyst=228 g/L) of Example 3 was obtained.

Specifications of the catalyst obtained in this Example 3 are summarized in Table 4.

Figure 2:
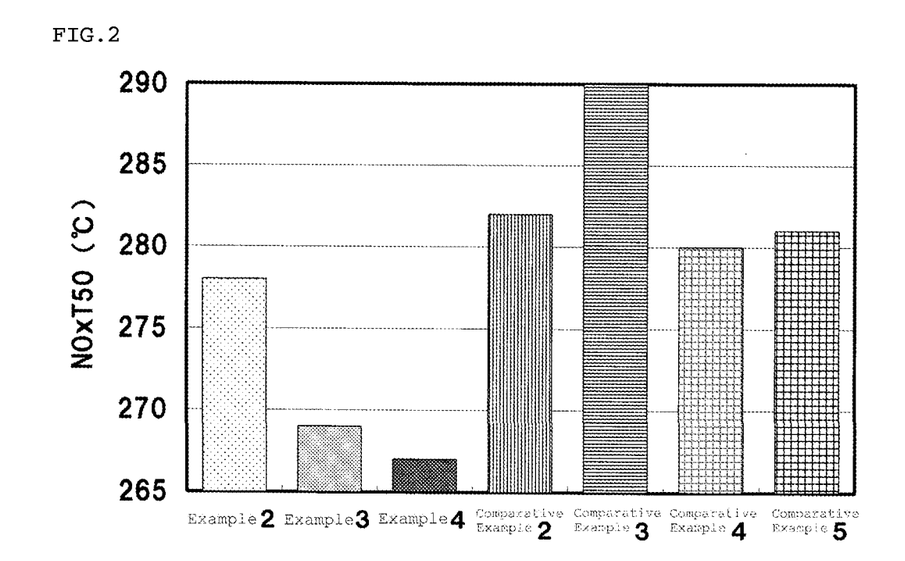
FIG. 2 is an evaluation result of a purification reaction for $NO_x$ by an catalyst for exhaust gas purification for automobiles after heat treatment at 1,000° C., and a graph showing catalyst bed temperature when purification ratio for $NO_x$ reached 50%.
Figure 3:
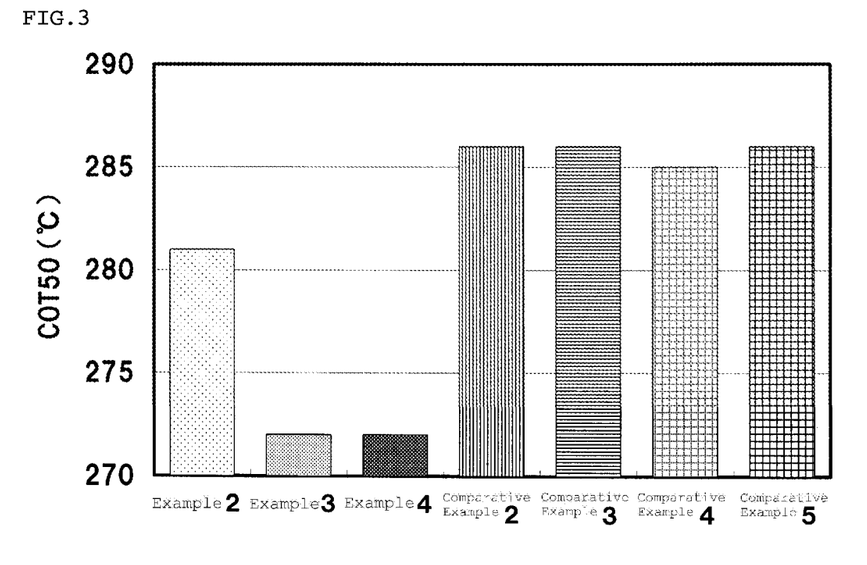
FIG. 3 is an evaluation result of a purification reaction for CO by an catalyst for exhaust gas purification for automobiles after heat treatment at 1,000° C., and a graph showing catalyst bed temperature when purification ratio for CO reached 50%.
Figure 4:
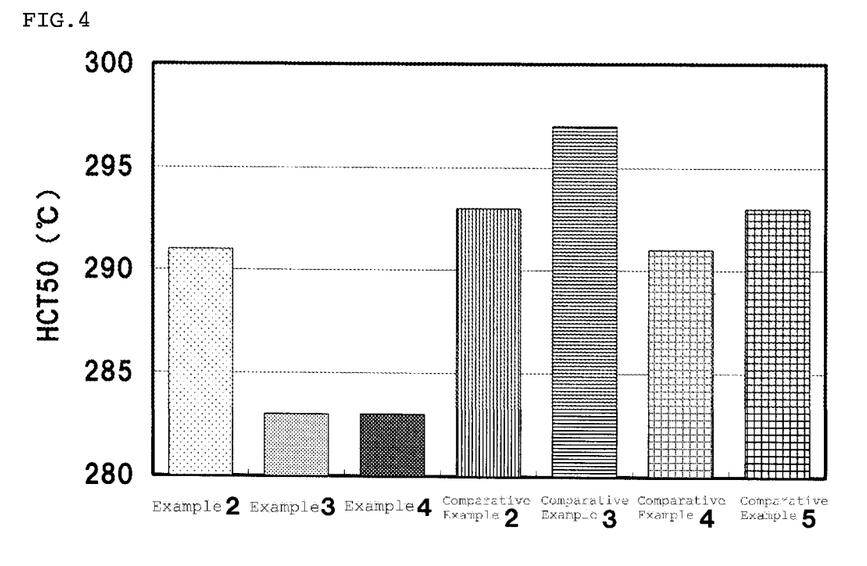
FIG. 4 is an evaluation result of a purification reaction for HC($C_3H_6$) by an catalyst for exhaust gas purification for automobiles after heat treatment at 1,000° C., and a graph showing catalyst bed temperature when purification ratio for HC reached 50%.

To a catalyst for model gas evaluation (a diameter of 25.4 mm×a length of 50 mm, 25.3 mL) cut out from the catalyst of the above Example 3, heat treatment (durability) was performed at 1,000° C. for 6 hours, and then subjected to a temperature rising light off test for $NO_x$, CO and HC, using the model gas evaluation apparatus II, which results are summarized in FIGS. 2 to 4.

Example 4

Lower Layer

A catalyst already coated with the lower layer was obtained by the same catalyst preparation method as in Example 2.
=Upper Layer=

In Example 2, α-alumina supported-neodymium oxide-zirconia powder i {average particle size (D50):10 μm} in an amount of 30.15% by weight was used by adding slurry α and slurry β, in a solid content ratio of 30:69.5, instead of α-alumina supported neodymium oxide-zirconia powder e in an amount of 10.05% by weight. Similarly as in Example 2, a catalyst (Pd=0.45 g/L, Rh=0.45 g/L, α-alumina supported-neodymium oxide-zirconia in an amount of 30% by weight, total amount of catalyst=228 g/L) of Example 4 was obtained.

Specifications of the catalyst obtained in this Example 4 are summarized in Table 4.

To the catalyst for model gas evaluation (a diameter of 25.4 mm×a length of 50 mm, 25.3 mL) cut out from the catalyst of the above Example 4, it was heat treated (durability) at 1,000° C. for 6 hours, and then subjected to a temperature rising light off test for $NO_x$, CO and HC, using the model gas evaluation apparatus II, which results are summarized in FIGS. 2 to 4.

In addition, after small pieces were cut out from the catalyst of the above Example 4 were heat treated (durability) at 1,000° C. for 6 hours inside an electric furnace, they were imbedded in a resin to obtain EPMA measurement samples. Using these catalyst samples, EPMA measurement was performed to determine residual ratio of Rh present at the upper layer, based on the results, which results are summarized in FIG. 5.

Comparative Example 2

Lower Layer

A catalyst already coated with the lower layer was obtained by the same catalyst preparation method as in Example 2.
=Upper Layer=

In Example 2, neodymium oxide-zirconia powder B was used, instead of α-alumina supported neodymium oxide-zirconia powder e in an amount of 10.05% by weight. Similarly as in Example 2 other than this, a catalyst of Comparative Example 2 (Pd=0.45 g/L, Rh=0.45 g/L, neodymium oxide-zirconia, total amount of catalyst=228 g/L) was obtained.

Specifications of the catalyst composition obtained in this Comparative Example 2 are summarized in Table 4.

To the catalyst for model gas evaluation (a diameter of 25.4 mm×a length of 50 mm, 25.3 mL) cut out from the catalyst of the above Example 4, it was heat treated (durability) at 1,000° C. for 6 hours, and then subjected to a temperature rising light off test for $NO_x$, CO and HC, using the model gas evaluation apparatus II, which results are summarized in FIGS. 2 to 4.

In addition, similarly as in the catalyst of Example 2, among two small pieces cut out from the catalyst of the above Comparative Example 2, using a diamond cutter or the like, one of them was heat treated (durability) at 1,000° C. for 6 hours inside an electric furnace, after that two pieces were each imbedded in a resin to obtain EPMA measurement samples (one for an initial state, and one after durability treatment). Using these catalyst samples, EPMA measurement was performed to determine residual ratio of Rh present at the upper layer, based on the results, which results are summarized in FIG. 5.

Comparative Example 3

Lower Layer

A catalyst already coated with the lower layer was obtained by the same catalyst preparation method as in Example 2.
=Upper Layer=

In Comparative Example 2 α-Alumina powder A was used, instead of neodymium oxide-zirconia powder B. Similarly as in Comparative Example 2 other than this, a catalyst of Comparative Example 3 (Pd=0.45 g/L, Rh=0.45 g/L, α-alumina, total amount of catalyst=228 g/L) was obtained.

Specifications of the catalyst composition obtained in this Comparative Example 3 are summarized in Table 4.

To the catalyst for model gas evaluation (a diameter of 25.4 mm×a length of 50 mm, 25.3 mL) cut out from the catalyst of the above Comparative Example 3, it was heat treated at 1,000° C. for 6 hours, and then subjected to a temperature rising light off test for $NO_x$, CO and HC, using the model gas evaluation apparatus II, which results are summarized in FIGS. 2 to 4.

Comparative Example 4

Lower Layer

A catalyst already coated with the lower layer was obtained by the same catalyst preparation method as in Example 2.
=Upper Layer=

In Example 2, γ-Alumina powder E, having a BET specific surface area of 150 m²/g and a pore size of 15 nm, was used, instead of α-alumina powder A. Similarly as in Example 2 other than this, a catalyst (Pd=0.45 g/L, Rh=0.45 g/L, neodymium oxide-zirconia which supports γ-alumina in an amount of 10% by weight, total amount of catalyst=228 g/L) of Comparative Example 4 was obtained.

Specifications of the catalyst composition obtained in this Comparative Example 4 are summarized in Table 4.

To the catalyst for model gas evaluation (a diameter of 25.4 mm×a length of 50 mm, 25.3 mL) cut out from the catalyst of the above Comparative Example 4, it was heat treated at 1,000° C. for 6 hours, and then subjected to a temperature rising light off test for $NO_x$, CO and HC, using the model gas evaluation apparatus II, which results are summarized in FIGS. 2 to 4.

Comparative Example 5

Lower Layer

A catalyst already coated with the lower layer was obtained by the same catalyst preparation method as in Example 2.
=Upper Layer=

In Example 4, γ-Alumina powder E was used, instead of α-alumina powder A. Similarly as in Example 4 other than this, a catalyst of Comparative Example 5 (Pd=0.45 g/L, Rh=0.45 g/L, γ-alumina supported-neodymium oxide-zirconia in an amount of 30% by weight, total amount of catalyst=228 g/L) was obtained.

Specifications of the catalyst composition obtained in this Comparative Example 5 are summarized in Table 4.

To the catalyst for model gas evaluation (a diameter of 25.4 mm×a length of 50 mm, 25.3 mL) cut out from the catalyst of the above Comparative Example 5, it was heat treated at 1,000° C. for 6 hours, and then subjected to a temperature rising light off test for $NO_x$, CO and HC, using the model gas evaluation apparatus II, which results are summarized in FIGS. 2 to 4.

TABLE 4

| Specifications | Upper layer | | | | Catalyst Composition 2 Rh/γ-alumina | Lower layer |
|---|---|---|---|---|---|---|
| | Catalyst composition 1 | | | | | |
| | Rh (wt %) | α-alumina (wt %) | γ-alumina (wt %) | Base material | | |
| Example 2 | 0.5 | 10 | 0 | Neodymium oxide-zirconia | Common | Common |
| Example 3 | | 20 | | | | |
| Example 4 | | 30 | | | | |
| Comparative Example 2 | | 0 | | | | |
| Comparative Example 3 | | | | α-alumina | | |
| Comparative Example 4 | | | 10 | Neodymium oxide-zirconia | | |
| Comparative Example 5 | | | 30 | | | |

[Evaluation Result 2]

From FIGS. 2 to 4 summarizing the model gas evaluation test by the above catalysts after heat treatment at 1,000° C. for 6 hours, the following can be understood on purification characteristics for $NO_x$, CO and HC.

It should be noted that T50 temperature is catalyst bed temperature when purification ratio for NOx, CO, or HC each reaches 50%, and it becomes an index of activity at low temperature. The lower T50 shows that a reaction initiates at the lower temperature, giving evaluation of higher catalytic activity.

The catalyst of the present invention using neodymium oxide-zirconia, as the base material for supporting rhodium, and supporting α-alumina in an amount of 10% by weight (Example 2), 20% by weight (Example 3), and 30% by weight (Example 4), exerted superior ignition performance at lower temperature, in purification performance for any of $NO_x$, CO and HC, as compared with Comparative Example 2 which does not support α-alumina, or Comparative Example 3 using α-alumina as the base material.

Further, the catalyst which uses γ-alumina instead of α-alumina, as a blocking agent, and supports it in an amount of 10% by weight (Comparative Example 4), or 30% by weight (Comparative Example 5), exerted generally far inferior purification performance for $NO_x$, CO and HC, as compared with Examples 2 to 4 of the present invention, which use α-alumina, as the blocking agent, except from purification performance for HC of Example 2 and Comparative Example 4.

In this way, in the case where the base material for supporting rhodium is neodymium oxide-zirconia, it has been confirmed that supporting of α-alumina in an amount of 10% by weight clearly enhances ignition performance at lower temperature, in purification performance for $NO_x$, CO and HC.

Example 5

Lower Layer

A catalyst already coated with the lower layer was obtained by the same catalyst preparation method as in Example 2.
=Upper Layer=
In Example 2, ceria-zirconia powder D was used, instead of neodymium oxide-zirconia powder B. Similarly as in Example 2 other than this, a catalyst of Example 5 (Pd=0.45 g/L, Rh=0.45 g/L, α-alumina supported-ceria-zirconia in an amount of 10% by weight, total amount of catalyst=228 g/L) was obtained.

Specifications of the catalyst obtained in this Example 5 are summarized in Table 5.

After small pieces cut out from the catalyst of the above Example 5 were heat treated (durability) at 1,000° C. for 6 hours inside an electric furnace, they were imbedded in a resin to obtain EPMA measurement samples. Using these catalyst samples, EPMA measurement was performed to determine residual ratio of Rh present at the upper layer, based on the results, which results are summarized in FIG. 5.

Figure 6:
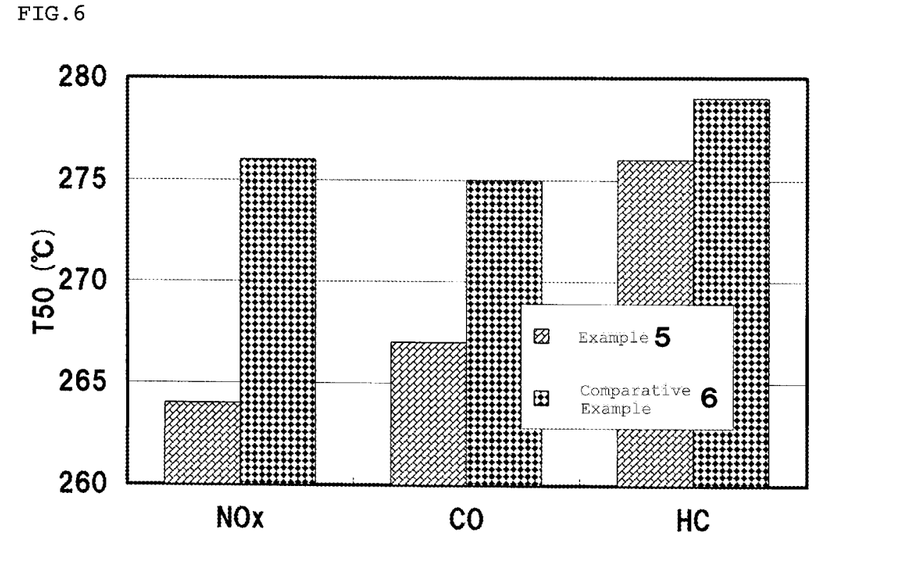
FIG. 6 is an evaluation result of a purification reaction for each of $NO_x$, CO and HC by an catalyst for exhaust gas purification for automobiles after heat treatment at 1,000° C., and a graph showing catalyst bed temperature when purification ratio for each of $NO_x$, CO and HC reached 50%.

In addition, to a catalyst for model gas evaluation (a diameter of 25.4 mm×a length of 50 mm, 25.3 mL) cut out from the catalyst of the above Example 5, it was heat treated at 1,000° C. for 6 hours, and then subjected to a temperature rising light off test for $NO_x$, CO and HC, using the model gas evaluation apparatus II, which results are summarized in FIG. 6.

Comparative Example 6

Lower Layer

A catalyst already coated with the lower layer was obtained by the same catalyst preparation method as in Example 2.
=Upper Layer=
In Comparative Example 2, ceria-zirconia powder D was used, instead of neodymium oxide-zirconia powder B. Similarly as in Comparative Example 1 other than this, a catalyst of Comparative Example 6 (Pd=0.45 g/L, Rh=0.45 g/L, ceria-zirconia, total amount of catalyst=228 g/L) was obtained.

Specifications of the catalyst obtained in this Comparative Example 6 are summarized in Table 5.

To a catalyst for model gas evaluation (a diameter of 25.4 mm×a length of 50 mm, 25.3 mL) cut out from the catalyst of the above Comparative Example 6, it was heat treated (durability) at 1,000° C. for 6 hours, and then subjected to a temperature rising light off test for $NO_x$, CO and HC, using the model gas evaluation apparatus II, which results are summarized in FIG. 6.

TABLE 5

| Specifications | Upper layer | | | Catalyst composition 2 Rh/γ-alumina | Lower layer |
|---|---|---|---|---|---|
| | Catalyst composition 1 | | | | |
| | Rh (wt %) | α-alumina (wt %) | Base material | | |
| Example 5 | 0.5 | 10 | Ceria-zirconia | Common | Common |
| Comparative Example 6 | | 0 | | | |

[Evaluation Result 3]

From FIG. 5 summarizing the EPMA evaluation test by the above catalyst before and after heat treatment at 1,000° C. for 6 hours, the following can be understood on transfer of Rh between the catalyst layers.

Firstly, in the initial state, there has been observed no transfer of Rh from the upper layer to the lower layer, not only in Example 2 of the present invention, which supports α-alumina, but also in Comparative Example 2, where α-alumina is absent.

Next, in the catalysts of Example 2 of the present invention (content of α-alumina: 10% by weight), where α-alumina and Rh were supported on neodymium oxide-zirconia and arranged at the upper layer, and Example 4 (the same: 30% by weight), Rh transferred to the lower layer was only 10% or less, even after heat treatment (durability) at 1,000° C. On the other hand, in the catalyst of Comparative Example 2 (the same: 0% by weight), where only Rh was supported on the same base material and arranged at the upper layer, it has been clarified that Rh transferred from the upper layer to the lower layer as many as about 30%, by heat treatment (durability).

In addition, also in the catalyst of Example 5 of the present invention (the same: 10% by weight), where α-alumina and Rh were supported on ceria-zirconia and arranged at the upper layer, transfer of Rh from the upper layer to the lower layer was only 10% or less, even after heat treatment (durability) at 1,000° C.

These results show that α-alumina functioned as a blocking material and suppressed transfer of Rh from the upper layer to the lower layer.

[Evaluation Result 4]

From FIG. 6 summarizing the model gas evaluation test by the above catalyst after heat treatment at 1,000° C. for 6 hours, the following can be understood on purification characteristics for $NO_x$, CO and HC.

In the catalyst of the present invention (Example 5), although the base material for supporting rhodium was changed from neodymium oxide-zirconia to ceria-zirconia, by supporting α-alumina in an amount of 10% by weight, purification performance for all of $NO_x$, CO and FIC was enhanced, and superior ignition performance at lower temperature was exerted, as compared with the catalyst which does not support α-alumina (Comparative Example 6). Among them, effect of α-alumina was most exerted in purification performance for $NO_x$.

As described above, change of the base material from neodymium oxide-zirconia to ceria-zirconia more significantly exerted effect on purification performance for $NO_x$, CO and HC by α-alumina.

INDUSTRIAL APPLICABILITY

The catalyst for exhaust gas purification for automobiles of the present invention is superior in purification performance for nitrogen oxides ($NO_x$), carbon monoxide (CO), and hydrocarbons (HC) in exhaust gas discharged from an internal combustion engine such as a gasoline engine or the like. However, the present invention is not limited to automotive applications, and is widely applicable also as the catalyst for exhaust gas purification for removing nitrogen oxides, carbon monoxide, and hydrocarbons in exhaust gas.

The invention claimed is:

1. A catalyst composition for exhaust gas purification for purifying nitrogen oxides ($NO_x$), carbon monoxide (CO), and hydrocarbons (HC) in exhaust gas, wherein rhodium (Rh) is supported, together with an α-alumina ($Al_2O_3$) particle, on a zirconia ($ZrO_2$)-type base material,
   wherein average particle size of the α-alumina particle is 10 nm to 1 μm, and is smaller than average particle size of the zirconia-type base material.

2. The catalyst composition for exhaust gas purification according to claim 1, wherein the zirconia-type base material comprises one or more members selected from a group consisting of ceria ($CeO_2$), neodymium oxide ($Nd_2O_3$), praseodymium oxide ($Pr_6O_{11}$), lanthanum oxide ($La_2O_3$) and yttrium oxide ($Y_2O_3$).

3. A catalyst for exhaust gas purification for automobiles, wherein the catalyst composition for exhaust gas purification according to claim 2 is coated on a honeycomb structure substrate, as a catalyst layer.

4. The catalyst composition for exhaust gas purification according to claim 1, wherein content of α-alumina supported on the zirconia-type base material is 5 to 60% by weight.

5. A catalyst for exhaust gas purification for automobiles, wherein the catalyst composition for exhaust gas purification according to claim 3 is coated on type a honeycomb structure substrate, as a catalyst layer.

6. The catalyst composition for exhaust gas purification according to a claim 1, wherein BET specific surface area of α-alumina is 20 $m^2$/g or smaller.

7. A catalyst for exhaust gas purification for automobiles, wherein the catalyst composition according to claim 6 is coated on a honeycomb structure substrate, as a catalyst layer.

8. A catalyst for exhaust gas purification for automobiles, wherein the catalyst composition according to claim 1 is coated on a honeycomb structure substrate, as a catalyst layer.

9. The catalyst for exhaust gas purification for automobiles according to claim 8, being coated with another catalyst layer comprising a noble metal different from rhodium, other than the catalyst layer.

10. The catalyst for exhaust gas purification for automobiles according to claim 9, wherein the noble metal is palladium (Pd) and/or platinum (Pt).

11. The catalyst for exhaust gas purification for automobiles according to claim 10, wherein total coated amount of the catalyst composition is 100 to 350 g/L per unit volume of the honeycomb structure substrate.

12. The catalyst for exhaust gas purification for automobiles according to claim 9, wherein total coated amount of the catalyst composition is 100 to 350 g/L per unit volume of the honeycomb structure substrate.

13. The catalyst for exhaust gas purification for automobiles according to claim 8, wherein total coated amount of the catalyst composition is 100 to 350 g/L per unit volume of the honeycomb structure substrate.

* * * * *